(12) United States Patent
Kim

(10) Patent No.: US 7,694,982 B2
(45) Date of Patent: Apr. 13, 2010

(54) SUB FRAME FOR VEHICLE

(75) Inventor: Kichang Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/325,954

(22) Filed: Dec. 1, 2008

(65) Prior Publication Data

US 2009/0152856 A1    Jun. 18, 2009

(30) Foreign Application Priority Data

Dec. 15, 2007    (KR) ..................... 10-2007-0131811

(51) Int. Cl.
*B60G 7/02* (2006.01)
(52) U.S. Cl. .............. 280/124.109; 180/311; 180/312; 280/781
(58) Field of Classification Search .......... 280/124.109, 280/781; 180/311, 312
See application file for complete search history.

(56) References Cited

U.S. PATENT DOCUMENTS 7,393,016 B2 *   7/2008   Mitsui et al. ................ 280/784

FOREIGN PATENT DOCUMENTS

| JP | 1997-095257 | 4/1997 |
|---|---|---|
| JP | 2004-249807 | 9/2004 |
| JP | 2005-212663 | 8/2005 |
| JP | 2007-038734 | 2/2007 |
| KR | 10-0633902 B1 | 10/2006 |
| KR | 10-2007-0106525 A | 11/2007 |

* cited by examiner

*Primary Examiner*—Eric Culbreth
(74) *Attorney, Agent, or Firm*—Morgan, Lewis & Bockius LLP

(57) ABSTRACT

A subframe for a vehicle may include an assembly including a front member, a rear member, and a pair of side members of which both front ends are jointed to distal ends of the front member and of which both rear ends are jointed to distal ends of the rear member respectively, wherein the front member, the rear member, and the side members form upper members and lower members that are combined to have a box-shaped close cross section by structural adhesive members.

10 Claims, 3 Drawing Sheets

SUB FRAME FOR VEHICLE

CROSS-REFERENCE TO RELATED APPLICATION

The present application claims priority of Korean Patent Application Number 10-2007-0131811 filed Dec. 15, 2007, the entire contents of which application is incorporated herein for all purposes by this reference.

BACKGROUND OF THE INVENTION

1. Field of the Invention

The present invention relates to a sub frame for a vehicle, particularly a sub frame for a vehicle which has an upper member and a lower member that are combined to have a box-shaped close cross section by adhesive members.

2. Description of Related Art

In general, a sub frame, also called 'suspension member', is a part formed by assembling parts of a power transmission and included in the chassis of a car body. As shown in FIG. 1, the sub frame is formed by assembling a front member 10 and a rear member 20 disposed in the transverse direction of the car body, and both side members 30 disposed in the longitudinal direction of the car body.

Front member 10 has at least one or more bending portion M1 formed in the transverse direction of the car body to protect an oil pan 40, such that the bending portion M1 makes it difficult to sense vibration due to deformation generated by bending and distorting vibration while reducing the strength.

Further, according to sub frames in the related art, as shown in FIG. 2, front member 10, rear member 20, and side members 30 are formed by combining upper members 11, 21, 31 and lower members 13, 23, 33 which have a U-shaped cross section, in which upper members 11, 21, 31 and lower members 13, 23, 33 are jointed by CO2 welding.

That is, upper members 11, 21, 31 and lower members 13, 23, 33 are provisionally combined to have a box-shaped close cross section by an upper jig 51 and a lower jig 53, and then front member 10, rear member 20, and side members 30 are formed by jointing upper members 11, 21, 31 and lower members 13, 23, 33 using CO2 welding.

In order to apply CO2 welding in manufacturing the sub frame as described above, upper and lower jigs 51, 53 are required to fix upper members 11, 21, 31 and lower members 13, 23, 33. However, upper and lower jigs 51, 53 increase cost of equipment and manufacturing cost.

On the other hand, reference numeral 'W1' in FIG. 2, which is not stated in the above, represents the welded joints.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a sub frame for a vehicle that has improved sensitivity of vibration due to deformation generated by bending and distorting vibration and improved strength by improving the combination structure of an upper member and a lower member, and can be manufactured without using jigs for combining the upper member and the lower member, thereby reducing cost of equipment and manufacturing cost.

In an aspect of the present invention, a sub frame for a vehicle may include an assembly including a front member, a rear member, and a pair of side members of which both front ends are jointed to distal ends of the front member and of which both rear ends are jointed to distal ends of the rear member respectively, wherein the front member, the rear member, and the side members form upper members and lower members that are combined to have a box-shaped close cross section by structural adhesive members. The structural adhesive member may be epoxy resin that is hardened while being foamed.

The lower members may include lower flanges integrally formed at both upper end portions thereof and the upper members include upper flanges integrally formed at both lower end portions thereof.

The upper flanges of the upper members may be bent inside substantially in a direction of lateral surface of the upper members, and the lower flanges of the lower members may be bent with the upper flanges substantially in the same cross section as the upper flanges, wherein the upper and lower flanges overlap each other.

The upper and lower flanges may have substantially the same curvature ratio.

The upper flanges may have an L-shaped cross section.

The upper flanges may face each other.

Each upper flange may face in an opposite direction.

The upper and lower members may be combined by the structural adhesive members disposed between the upper flanges and the lower flanges. The structural adhesive member may be epoxy resin that is hardened while being foamed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
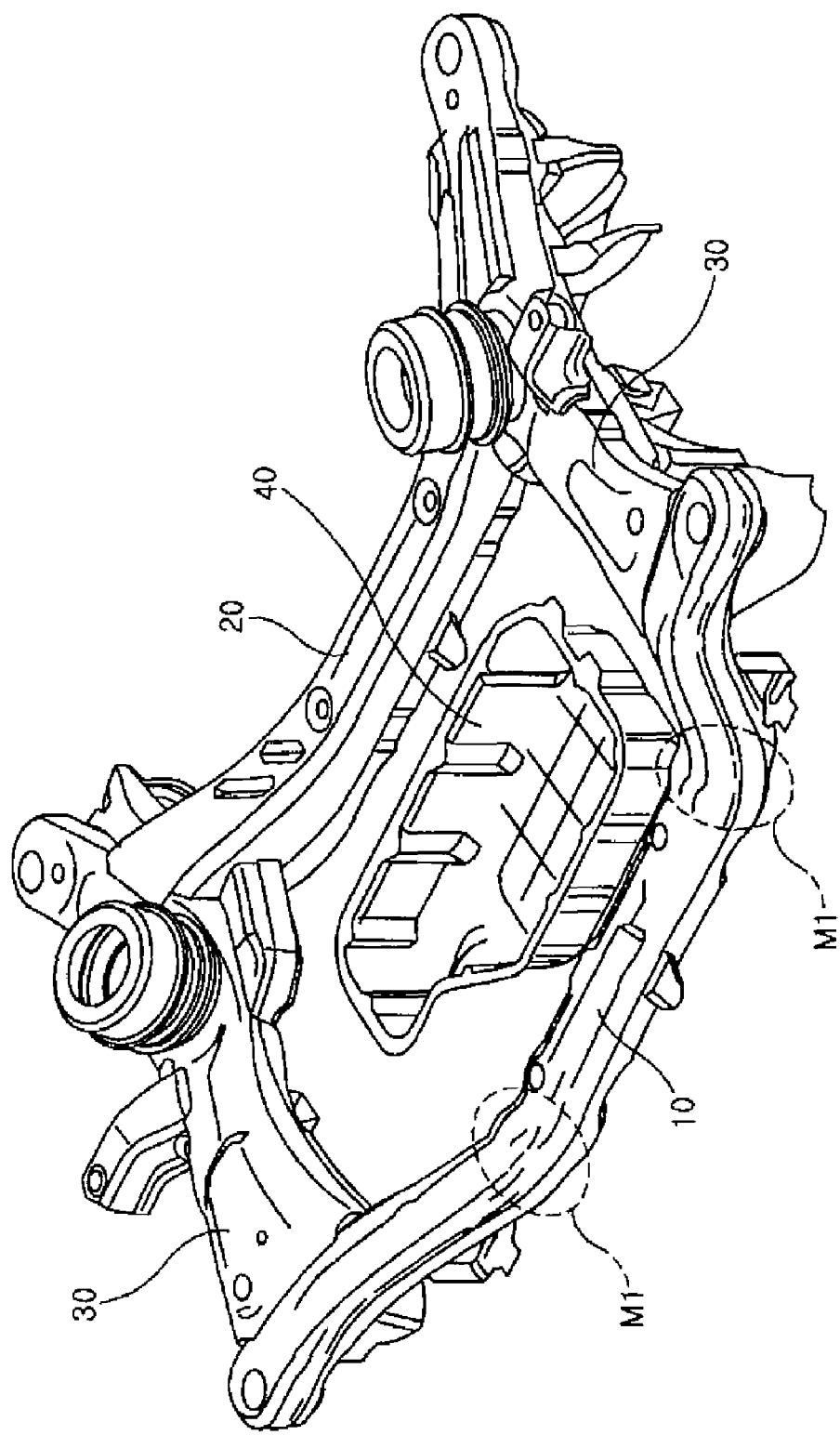
FIG. 1 is a perspective view of an exemplary sub frame.

A sub frame according to various embodiments of the invention, as described above with reference to FIG. 1, is formed by assembling a front member 10 and a rear member 20 disposed in the transverse direction of the car body, and a pair of side members 30 disposed in the longitudinal direction of the car body and jointed to front member 10 and rear member 20 at both sides.

Front member 10 has at least one or more bending portion M1 formed in the transverse direction of the car body to protect an oil pan 40.

Figure 3:
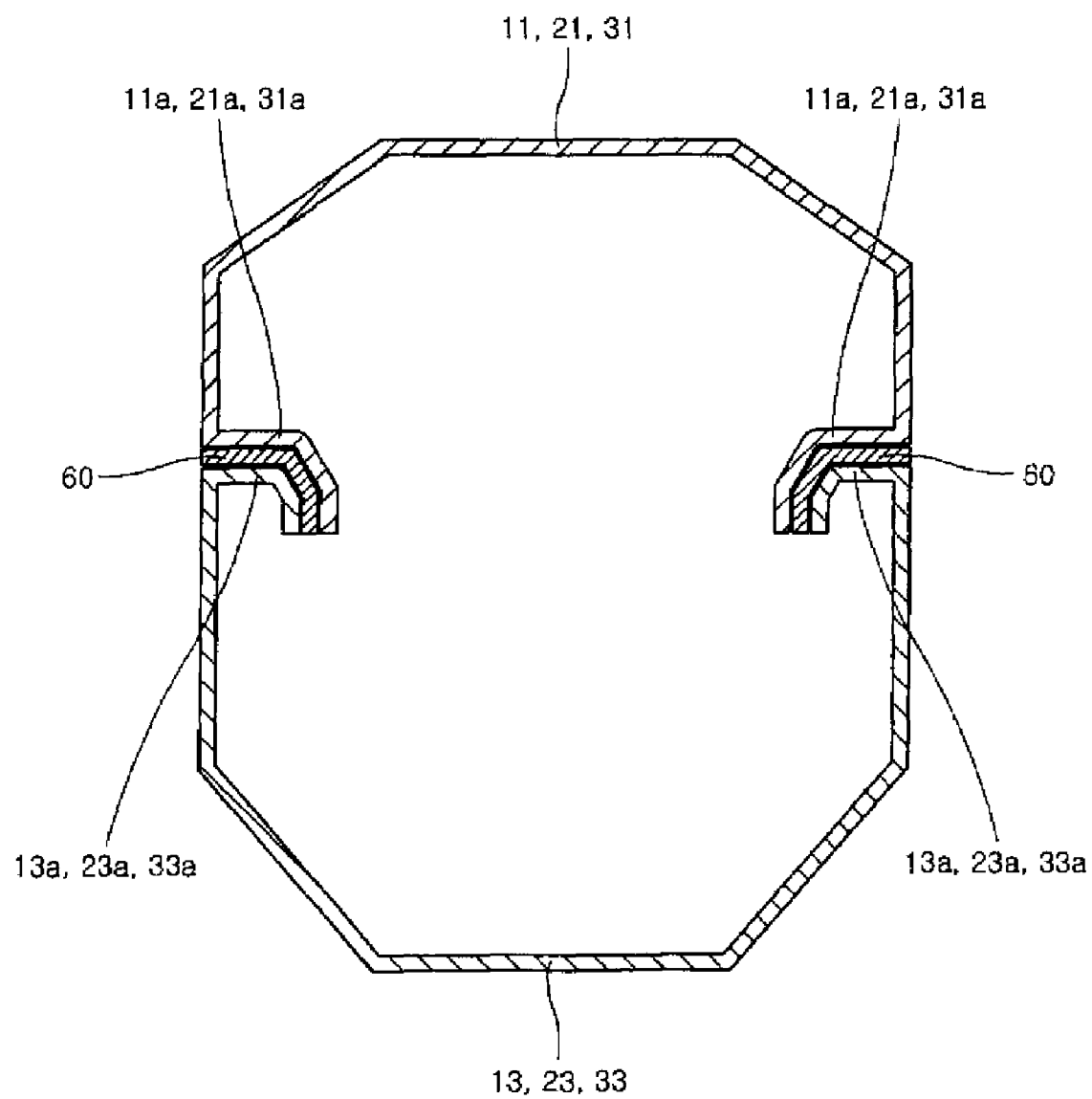
FIG. 3 is a view illustrating an exemplary combination structure of an upper member and a lower member of a sub frame according to the present invention.

Further, front member 10, rear member 20, and side members 30 are formed by upper members 11, 21, 31 and lower members 13, 23, 33 that are combined to have a box-shaped close cross section, as shown in FIG. 3.

Upper flanges 11a, 21a, 31a, and lower flanges 13a, 23a, 33a, may be bent inside in a direction of lateral surface thereof. Upper flanges 11a, 21a, 31a, and lower flanges 13a, 23a, 33a at one side are formed in the same direction so that upper flanges 11a, 21a, 31a, or lower flanges 13a, 23a, 33a may be overlapped each other.

In various embodiments of the present invention, upper flanges 11a, 21a, 31a, which are bent inside in a vertical direction in the drawing to face each other and have an L-shaped cross section, are integrally formed at both distal ends of upper members 11, 21, 31. One will appreciate that the upper flanges may be monolithically formed with the distal ends of upper members.

Further, lower flanges 13a, 23a, 33a, which are bent in the same cross section as upper flanges 11a, 21a, 31a and overlap inner surfaces of upper flanges 11a, 21a, 31a, are integrally formed at both distal ends of lower members 13, 23, 33. One will appreciate that the lower flanges may be monolithically formed with the distal ends of lower members.

In this structure, the both distal ends of upper members 11, 21 and lower members 13, 23 that are components of front member 10 and lower member 20 implement the ends of both sides that are positioned in the longitudinal direction of the car body when front member 10 and rear member 20 are cut in the longitudinal direction of the car body.

Further, the both distal ends of upper member 31 and lower member 33 that are components of side members 30 implement the ends of both sides that are positioned in the transverse direction of the car body when side members 30 are cut in the transverse direction of the car body.

On the other hand, structural adhesive members 60 according to various embodiments of the invention are disposed between upper flanges 11a, 21a, 31a and lower flanges 13a, 23a, 33a, such that upper flanges 11a, 21a, 31a and lower flanges 13a, 23a, 33a are combined to have a box-shaped close cross section by structural adhesive members 60.

Structural adhesive member 60 according to various embodiments of the invention is an adhesive member that has high strength and rigidity to welding and can reduce vibration and noise, and made of foam-hardened epoxy resin.

Structural adhesive member 60 is preheated and foamed by high-temperature heat in painting, and then hardened in cooling such that upper members 11, 12, 13 and lower members 13, 23, 33 are integrally combined with each other.

Therefore, according to various embodiments of the invention, upper members 11, 21, 31 are loaded onto lower members 13, 23, 33 such that structural adhesive member 60 is disposed on lower flanges 13a, 23a, 33a and upper flanges 11a, 21a, 31a are disposed on structural adhesive member 60.

In this position, as the assembly of upper members 11, 21, 31 and lower members 13, 23, 33 undergoes painting process, structural adhesive member 60 is foamed by high-temperature heat.

Foamed structural adhesive member 60 integrally combines upper members 11, 21, 31 with lower members 13, 23, 33 while being hardened in cooling.

Therefore, even though front member 10 has at least one or more bending portion M1 to protect oil pan 40 in the sub frame according to various embodiments of the invention, it is possible to prevent sensitivity of vibration and strength from being decreased by bending portion M1, due to the characteristics of structural adhesive member 60 that has high strength and rigidity to welding and can reduce vibration and noise.

Figure 2:
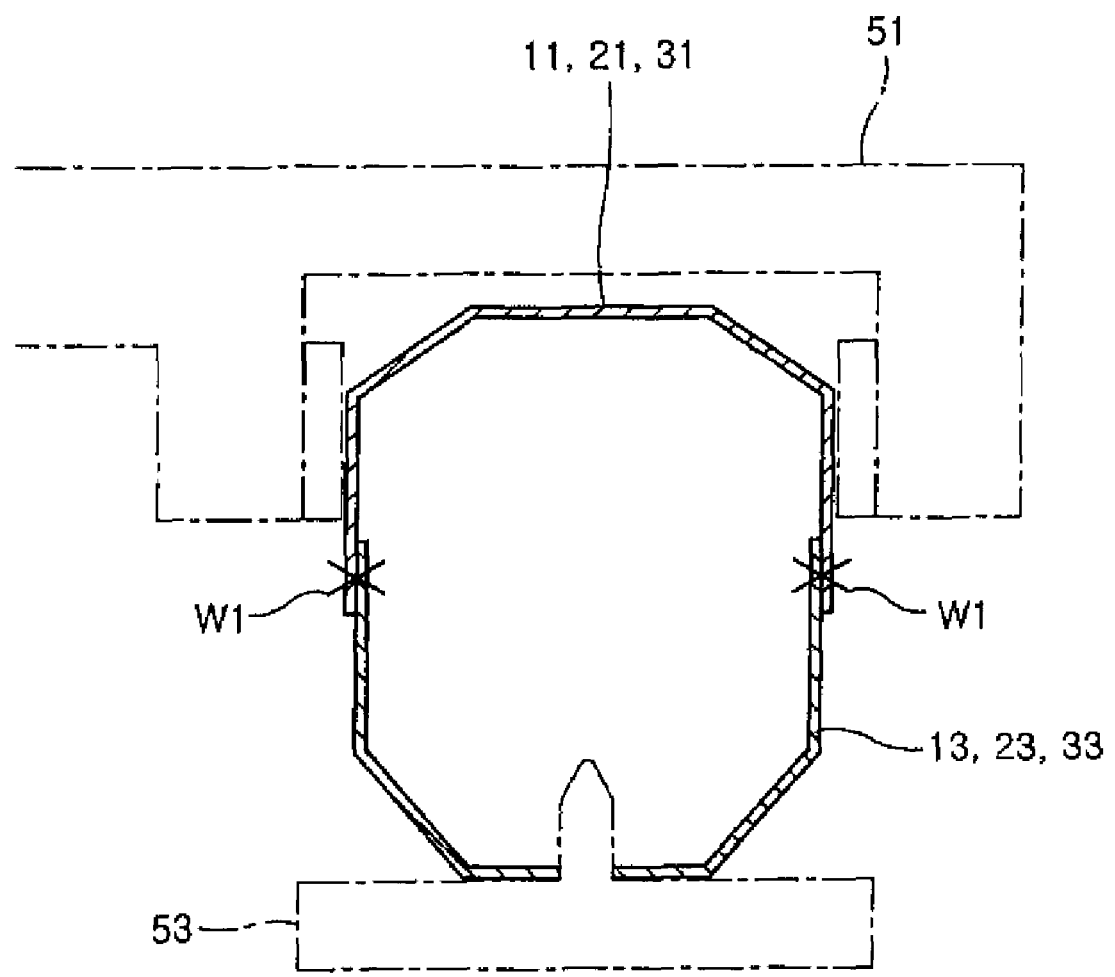
FIG. 2 is a view illustrating the combination structure of an exemplary upper member and lower member of a sub frame.

Further, in the sub frame according to various embodiments of the invention, since upper members 11, 21, 31 and lower members 13, 23, 33 can be combined without welding, upper and lower jigs 51, 53 in the related art described with reference to FIG. 2 are not needed, such that cost of equipment and manufacturing cost can be reduced.

The sub frame for a vehicle according to various aspects of the present invention has durability and life improved by structural adhesive members that has high strength and rigidity to welding and can reduce vibration and noise.

For convenience in explanation and accurate definition in the appended claims, the terms "upper", "lower", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sub frame assembly for a vehicle, the sub frame assembly comprising:
   an upper member including opposing lower ends;
   a lower member including opposing upper ends, the upper ends complementary in shape with the lower ends of the upper member; and
   a structural adhesive member affixing each upper end with a respective lower end, wherein the upper and lower members are combined to form a box-shaped cross section,
   wherein the lower member includes lower flanges integrally formed at respective upper ends of the lower member, and wherein the upper member includes upper flanges integrally formed at respective lower ends of the upper member,
   wherein a portion of the upper flanges of the upper members extend in a lateral direction, and a portion of the lower flanges of the lower members extend in a lateral direction and overlap respective portions of the upper flanges, and
   wherein the upper and lower flanges have complementary L-shaped cross sections.

2. The sub frame assembly for a vehicle as defined in claim 1, wherein the structural adhesive member is epoxy resin that is hardened while being foamed.

3. The sub frame assembly for a vehicle as defined in claim 1, wherein the upper and lower flanges have complementary curvatures.

4. The sub frame assembly for a vehicle as defined in claim 1, wherein the upper flanges extend toward one other.

5. The sub frame assembly for a vehicle as defined in claim 1, wherein the lower flanges extend toward one another.

6. The sub frame assembly for a vehicle as defined in claim 1, wherein the structural adhesive member is disposed between the upper flanges and the lower flanges to affix the upper and lower members to one another.

7. The sub frame assembly for a vehicle as defined in claim 6, wherein the structural adhesive member is epoxy resin.

8. The sub frame assembly for a vehicle as defined in claim 7, wherein the structural adhesive member is hardened while being foamed.

9. A vehicle chassis comprising the sub frame assembly for a vehicle as defined in claim 1.

10. A passenger vehicle comprising the vehicle chassis as defined in claim 9.

* * * * *